Fig. 1

INVENTOR.
George T. Meyers.
BY Robert Mahoney
ATTORNEYS.

May 4, 1937.  G. T. MEYERS  2,079,519
APPARATUS FOR FEEDING MOLTEN GLASS
Filed May 7, 1936   5 Sheets-Sheet 3

INVENTOR.
George T. Meyers.
BY
ATTORNEYS.

May 4, 1937.　　　　G. T. MEYERS　　　　2,079,519
APPARATUS FOR FEEDING MOLTEN GLASS
Filed May 7, 1936　　　5 Sheets-Sheet 4

INVENTOR.
George T. Meyers.
BY
ATTORNEYS.

May 4, 1937.  G. T. MEYERS  2,079,519
APPARATUS FOR FEEDING MOLTEN GLASS
Filed May 7, 1936  5 Sheets-Sheet 5

INVENTOR.
George T. Meyers.
BY
Cashed & Mahoney
ATTORNEYS.

Patented May 4, 1937

2,079,519

UNITED STATES PATENT OFFICE 2,079,519

APPARATUS FOR FEEDING MOLTEN GLASS

George T. Meyers, Parkersburg, W. Va.

Application May 7, 1936, Serial No. 78,431

17 Claims. (Cl. 49—55).

My invention relates to apparatus for feeding molten glass. It has to do, more particularly, with apparatus for feeding molten glass from the forehearth of a glass melting furnace to a mold or the like for shaping into the desired article.

A large number of various types of glass feeders have been devised in the past. One type of prior art feeder comprises a spout which is connected to the glass furnace and has an orifice adjacent its outer end through which the glass flows by a gravity force or under the influence of a controlling member such as a plunger or a pneumatic controlling member. As the glass issues through the orifice, it is separated into charges by means of shears, and the charges drop into molds which are disposed a considerable distance below the spout. One of the great disadvantages of this type of prior art feeder resides in the fact that during the period when a charge issues from the spout orifice and drops into the mold it is affected by atmospheric conditions. Drafts, temperature conditions, or moisture conditions of the atmosphere produce undesirable effects on the glass charges. The atmospheric conditions may cause bubbles, waves or cords in pressed and blown ware, white streaks or crystallized glass, or variated hot or cold glass, and unequal weights may be caused by temperature variations. Attempts have been made to prevent atmospheric conditions from affecting the glass during the time it is fed from the spout to the mold. It has been proposed to place the molds directly below the spout so that the glass would issue through the orifice and feed directly into the molds without dropping through any appreciable distance. However, this proposal did not prove satisfactory. It was found that it was necessary for the glass charges to drop through a considerable distance before entering the molds in order that they would drop solidly into the molds.

Another great disadvantage of prior art glass feeders resides in the fact that it has been practically impossible to obtain glass charges of predetermined weights which vary in weight in a predetermined manner during one complete cycle of operation. Consequently, it has been impossible in the past to provide a mold table with molds for making a number of articles of different weights because it has been impossible to vary the weights of the glass charges in a predetermined manner during a cycle of operation. It often happens, especially in a small glass manufacturing plant, where the orders for each size of ware are comparatively small, that it is desirable to produce several articles of different size, within a limited range, on a single mold table. With prior art glass feeders, it has been impossible to do this without wasting glass. It has been necessary for the glass manufacturer either to produce on a mold table all articles of the same size or to produce articles thereon which vary in size but to use the same amount of glass in each article, thereby wasting a considerable quantity of glass.

One of the objects of my invention is to provide a practical apparatus for feeding molten glass from a glass melting furnace to a mold in such a manner that the glass will not be affected in any way by atmospheric conditions.

Another object of my invention is to provide apparatus for feeding molten glass in the form of charges of predetermined weights which vary in weight in any predetermined manner during one complete cycle of operation or which may all be of a uniform weight.

Another object of my invention is to provide apparatus for feeding molten glass of the type indicated which is simple, practical and efficient.

Another object of my invention is to provide a glass feeder of the type indicated which is of such a nature that the speed of operations and the character of the gobs or charges produced may be controlled and varied in an effective manner and within a very wide range.

In its preferred form my invention contemplates the provision of a glass feeder embodying a spout having an orifice in its outer end through which the glass flows by a gravity force. I provide controlling means for controlling the flow of glass through the orifice. This controlling means may either take the form of vacuum controlling means or of a plunger. In order to prevent atmospheric conditions from affecting the glass charges or gobs as they pass from the orifice to the mold table, which is disposed a considerable distance below the spout orifice, I provide a tube which is connected to the orifice and which extends to a point directly adjacent the mold table where it will communicate with successive molds moved into position to receive the glass charges. The glass will flow from the spout through the orifice and will be sheared by means of novel shears which I have provided and will thus be separated into charges or gobs. Each gob will drop through the tube until it reaches the mold. Thus, it will not be affected by atmospheric conditions during its passage from the spout orifice to the mold.

In order to obtain glass charges of predetermined weights which vary in weight in a predetermined manner during one complete cycle of operation I provide mechanism for controlling the means that controls the issuance of glass from the spout discharge orifice. This mechanism may be set so that the amount of glass issuing from the discharge orifice of the spout will vary during successive intervals in order that the weight of the glass charges produced will vary in a predetermined manner. However, this means may be adjusted in such a manner that the glass charges obtained will all be of a uniform weight.

The preferred embodiment of my invention is illustrated in the accompanying drawings wherein similar characters of reference designate corresponding parts and wherein.

Figure 1:
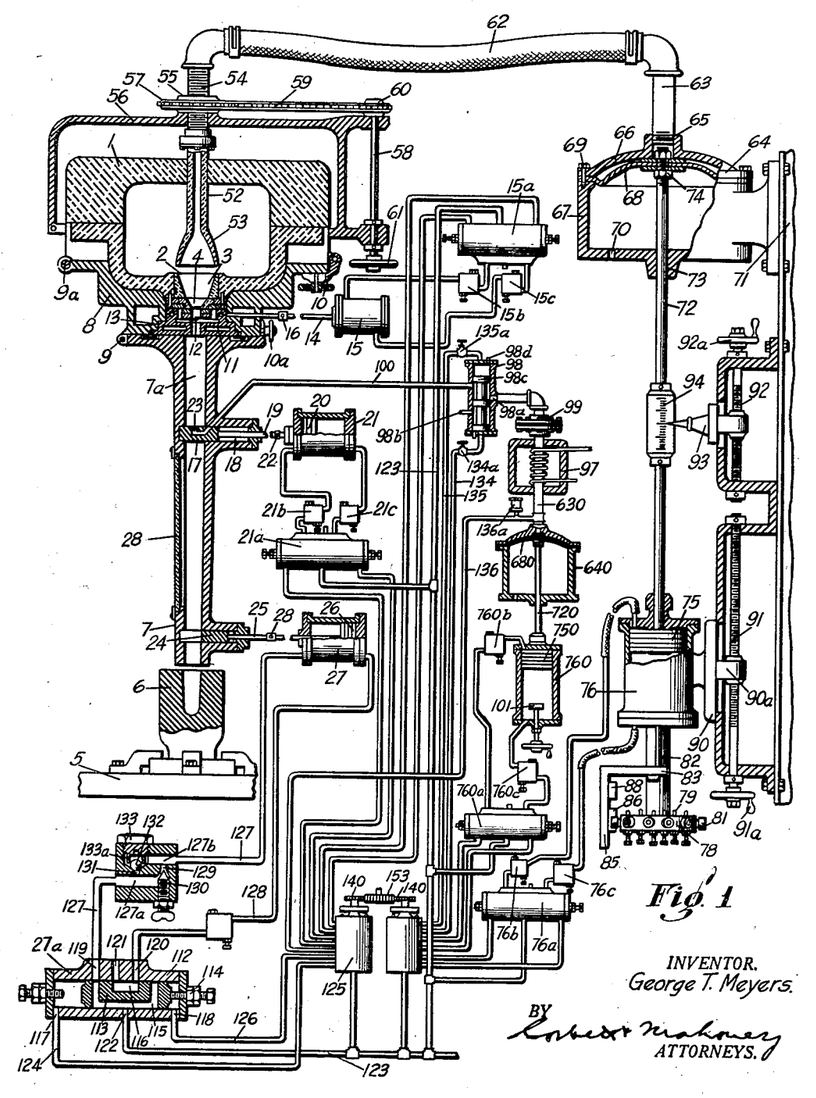
Figure 1 is a view partly in section and partly in side elevation illustrating a glass feeder made in accordance with the principles of my invention, the glass feeder having a vacuum control for controlling the issuance of glass from the spout.

With reference to the drawings and particularly to Figure 1, I illustrate my glass feeder as comprising a spout 1 which may be of any usual construction. The spout 1 has a glass discharge orifice 2 in the bottom thereof having a removable bushing 3 disposed therein. A second removable bushing 4 is disposed below the bushing 3 and may be removed and replaced with a bushing of different size depending upon the size of the glass charge or gob desired.

*Means for preventing glass charges from being affected by atmospheric conditions*

It will be noted from Figure 1 that a mold table 5 is arranged a considerable distance below the orifice of the spout. This mold table carries a plurality of molds 6 and is rotatable in the usual manner to bring successive molds into the proper position to receive the charges of glass. In order that the glass will not be affected by atmospheric conditions during the time it issues from the orifice and drops from the spout to the mold, I provide a tube 7. This tube extends from a point at the orifice where it is connected to the spout to a point directly adjacent the mold 6. The mold charges are adapted to drop through this tube 7 into the molds. The tube 7 is hingedly supported on a member 8 as at 9. The member 8 is hingedly supported beneath the spout as at 9a. This member 8 is adapted to embrace the bottom of the spout 1 as indicated. It is held in the position indicated in Figure 1 by means of an adjustable latch member 10 which will normally firmly clamp it in position but which may be adjusted to permit downward swinging of the member 8. The member 8 is provided with a water jacket 11 adjacent the orifice 2 to prevent overheating thereof. The tube 7 is held in operative position on member 8 by an adjustable latch 10a like latch 10.

I provide shears 12 for shearing the stream of glass, issuing from the orifice 2, at proper intervals to form the gobs or mold charges. These shears 12 are in the form of a compact unit which is located in a socket 13 formed in the member 8 directly below the bushing structure. These shears will be firmly clamped in position when the tube 7 is in operative position. The particular structure of these shears is important for several reasons. The shear structure will be described in detail hereinafter. The shear structure is operated by a piston rod 14 connected to a piston operating in a cylinder 15. A coupling 16 is disposed in the piston rod to permit disconnection of the piston rod from the piston when it is desirable to swing the member 8 downwardly away from operative position, for example, to change the bushings.

At a substantial distance below the orifice 2 I provide a gate 17 in the tube 7. This gate is slidably mounted and is adjustable between the position indicated in Figure 1 where it closes passageway 7a in tube 7, at the point where the gate is located, and a position within a chamber 18 where it will permit passage of the gob through the passageway 7a. The gate 17 is automatically moved between the two positions by means of a piston rod 19 connected to a piston 20 which reciprocates in a cylinder 21. A coupling 22 is interposed in piston rod 19 to permit disconnection of the piston rod from the piston when it is desired to swing the member 8 or the tube 7 carried thereby into inoperative position. The gate 17 is provided with an air pressure or exhaust passageway 23. This passageway 23 is provided so that air may be applied in the chamber within the tube 7 above the gate 17 when it is in the position indicated in Figure 1 or be withdrawn therefrom when desired.

Adjacent the extreme lower end of the tube 7 I provide a second gate 24 which is practically identical with the gate 17 with the exception that it does not have a duct similar to the duct 23. This gate 24 is operated by means of a piston rod 25 connected to a piston 26 disposed in a cylinder 27. A coupling 28 is interposed in the piston rod 25 to permit disconnection of the piston rod 25 from the piston 26 when the tube 7 is adapted to be swung into inoperative position. A window 7b of suitable transparent material is provided between the gates 17 and 24 so that the gobs dropping through the tube 7 may be observed at this point.

It will be apparent from the above that the gobs of glass will pass from the spout to the mold without being affected by the atmospheric conditions. The gates 17 and 24 are so operated with relation to each other that when the gate 17 is open, the gate 24 will be closed and when the gate 24 is open the gate 17 will be closed. This insures that there will be no danger of drafts passing up through the tube 7 and affecting the glass being discharged through the orifice 2. The tube 7 is of such a diameter that during the passage of the gobs therethrough, they will not contact with the walls thereof, as indicated in Figures 2 to 11. However, the tube 7 preferably converges towards its lower end as indicated. Thus, the gobs of glass will drop through the tube 7 and fall a considerable distance before entering the mold 6. Consequently, they will drop firmly into the molds, which is very desirable.

*Shear structure*

Figure 16:
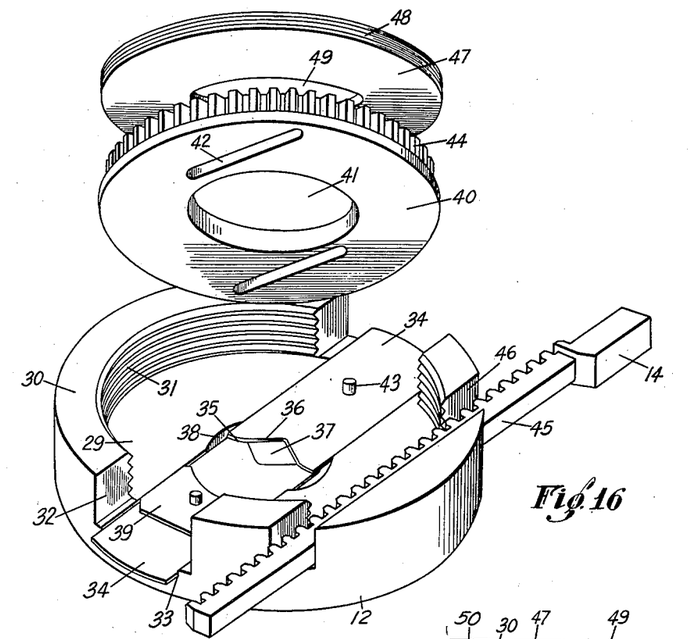
Figure 16 is a perspective view of the shears which I preferably employ with my glass feeder showing the parts thereof in disassembled relation.

I will now describe the particular shear structure which I preferably employ and which I previously designated generally by the reference character 12. This shear structure is illustrated best in Figures 16, 17, and 18. Because of the location of the shear structure, indicated in Figure 1, it is necessary that it be very compact. Also, because it is within the structure 8 that carries the tube 7, it is important that it can be operated from a point outside the member 8 without having any large openings or slots for the operating connections which might permit drafts to pass within the member 8 and the tube 7. My shear structure is operable by a single rod 14 which extends through a small opening in the wall of member 8.

The shear structure 13 comprises a main disk-like supporting member 29 having an upstanding peripheral flange 30. This flange 30 has its inner surface threaded as at 31. At diametrically opposed points the flange 30 is cut away as at 32 and at the bottom of these cutaway portions 32 guideways 33 are provided for reciprocable shear blades 34. A pair of these shear blades 34 is provided and the inner ends of the blades overlap, as indicated at 35, at certain periods. The inner edge or cutting edge of each blade has a V-shaped notch 36 formed therein. When the blades 34 are in their outermost positions, an aperture or space 37 is formed through which a stream of glass may pass. A centrally disposed aperture 38 is provided in the body portion of member 29 for permitting passage of the stream of glass therethrough. A member 39 is provided on the upper surface of the lower shear blade and is of the same thickness as the shear blades. The member 40 will rest against this member 39 and also the top shear blade 34, both of these members being at the same level.

The annular member 40 is disposed within the flange 30 and above the blades 34 and is rotatable within the flange. This member 40 is provided with a central aperture 41 to permit passage of the stream of glass therethrough. It is further provided with a pair of slots 42. Each slot 42 receives a pin 43 mounted on one of the blades 34. The arrangement of the slots 42 is indicated best in Figure 17. From this figure it will be apparent that when the member 40 is rotated, the slots 42 will cooperate with the pins 43 to move the blades 34 inwardly and relative to each other, as indicated by the arrows in this figure. This is due to the fact that the slots are arranged chordal to the annular edge of member 40 and parallel with each other, as indicated, and when member 40 is rotated the pins 43 will be moved towards the center of member 40, and, consequently, the blades 34 will be moved inwardly. Thus, they will cut through the stream of glass passing through the aperture 37.

Figures 17, 18:
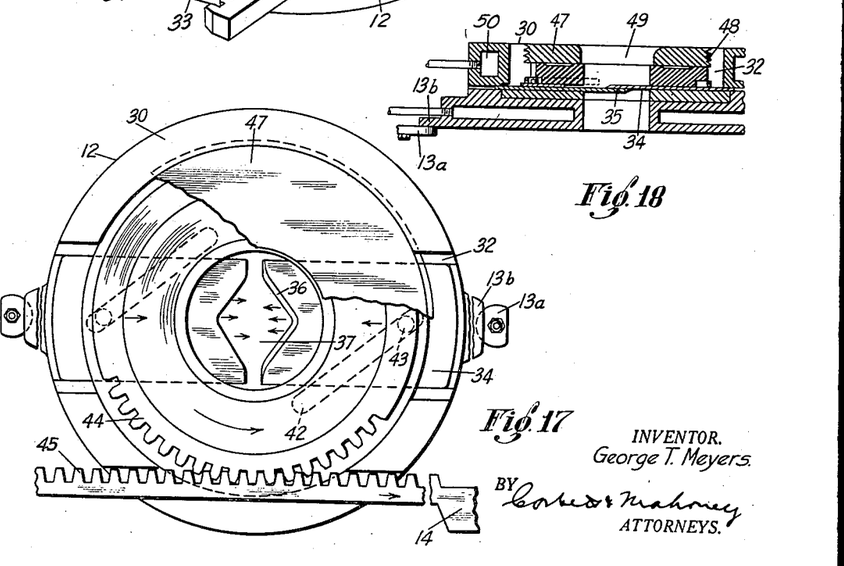
Figure 17 is a plan view, partly broken away, of the shear structure illustrated in Figure 16.
Figure 18 is a section taken through the shear structure illustrated in Figure 17.

The member 40 is provided with gear teeth 44 along its periphery. These gear teeth 44 are adapted to mesh with a rack 45 which is disposed substantially tangential to the member 40. The rack 45 is formed on the outer end of the piston rod 14. It is slidably mounted in slots 46 formed in the flange 30 of member 29 at points directly opposite each other. A cap member 47 is provided with threads 48 on its periphery which cooperate with the threaded inner surface 31 of flange 30. This cap member 47 is adapted to be screwed into position within flange 31 so as to hold the member 40 and, consequently, the blade members 34 in position on the member 29. This cap member is provided with a centrally disposed aperture 49 to permit passage of the stream of glass therethrough. The entire shear structure fits within an annular water-jacket member 50, as illustrated in Figure 18, which serves to prevent overheating of the shear structure. The shear structure, including the water-jacket, is removably held in position merely by adjustable ears 13a, secured to the spout, which cooperate with lugs 13b formed on member 50.

It will be noted that the shear structure is operated by a single member, viz., the rod 14, which extends through the wall of member 8. Since only a single small opening is required for the shear operating mechanism, there will be no danger of drafts reaching the inner portions of member 8 and tube 7. It will also be noted that this shear structure is very compact and, consequently, can be located within the limited space provided in the socket 13 disposed within member 8. It will also be noted that since the shear blades have V-shaped cutting edges and since they move through the glass from diametrically opposite points, they will tend to centralize the gobs of glass within the passageway 7a of the tube 7, rather than deflect it to one side, which will prevent the gobs from contacting with the walls of the tube.

Figures 19, 20, 21:
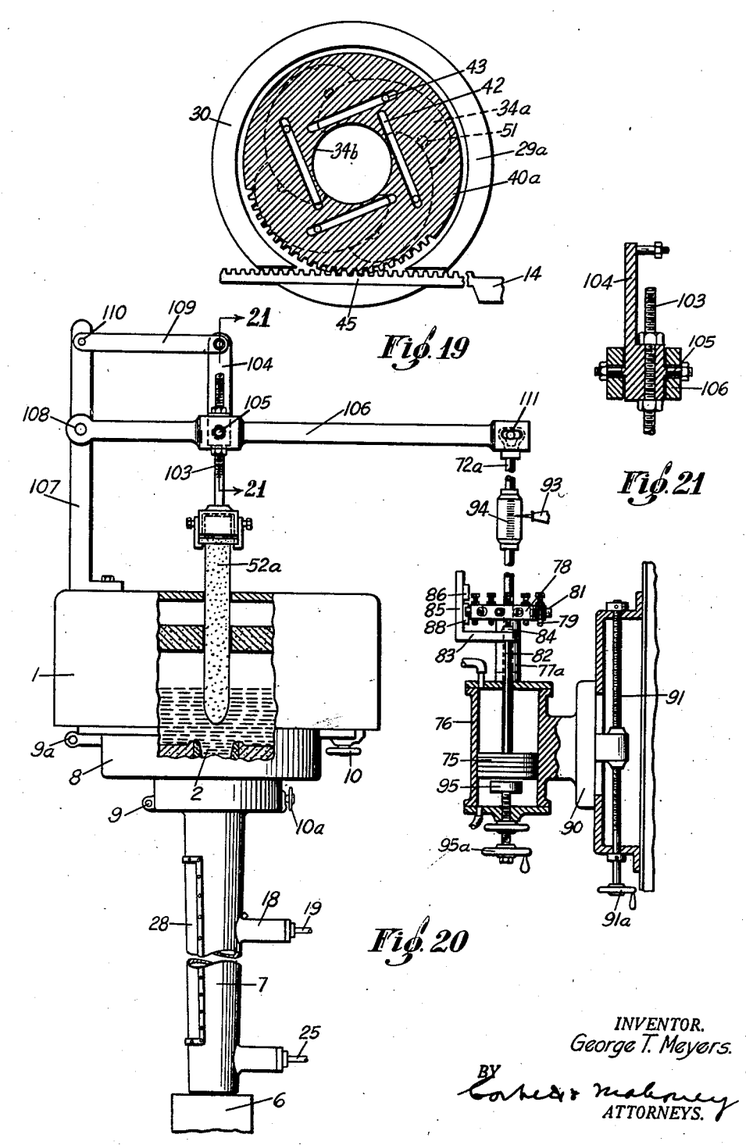
Figure 19 is a horizontal section taken through a modified form of shears.
Figure 20 is a side elevation of a feeder which is practically the same as that illustrated in Figure 1 with the exception that a plunger is provided for controlling the flow of glass through the spout orifice instead of the vacuum control provided in the feeder illustrated in Figure 1.
Figure 21 is a section taken substantially along line 21—21 of Figure 20.

In Figure 19 I illustrate a slightly different form of shear structure. The shear structure is operated by means of the piston rod 14 and rack 45 as before. The rack 45 meshes with gear teeth formed on the periphery of a member 40a which is quite similar to the member 40. In fact, it is the same as member 40 with the exception that it is provided with four slots 42 instead of two. These slots cooperate with pins 43, one of which is mounted on the upper surface of each of four shear blades 34a which are provided. Each shear blade 34a has one end pivoted as at 51 to a member 29a which is practically the same as member 29. The shear blades 34a are of substantially arcuate form, as indicated, and have cutting edges 34b on their inner edge adjacent their free ends. The slots 42 and pins 43 are so arranged that when the member 40a is rotated all of the blades 34a will be swung inwardly simultaneously towards the center of the member 29a. Consequently, the blades will cut through the stream of glass passing through the shear structure.

It will be noted that this shear structure is also very compact and is operated in the same manner as the other shear structure. Furthermore, it will be noted that because of the arrangement and movement of blades 34a, the gob which is sheared from the glass issuing through orifice 2 will be centered within the tube 7.

*Means for controlling issuance of glass through spout orifice*

As indicated in Figure 1, the means for controlling the issuance of the glass from the spout is vacuum controlled. This means comprises a tubular member 52 of refractory material which has a bell-shaped lower end 53. The upper end of the member 52 is connected to a metal tube 54 which is threaded to receive a collar 55 that rests against a boss formed on the upper surface of a support 56. The collar 55 has a sprocket 57 formed integrally therewith which may be rotated by a shaft 58 mounted on the support 56 and which is connected to the sprocket 57 by means of a sprocket chain 59 and a sprocket 60 keyed on the upper end of shaft 58. A hand wheel 61 is provided for rotating the shaft 58. Thus, by rotating the hand wheel 61 the position of the member 52 relative to the orifice 2 may be adjusted. It may be adjusted towards or away from the orifice depending upon the viscosity of the glass and the size of the charges it is desired to obtain.

The member 54 is connected by means of a flexible conduit 62 to a pipe 63 threaded into the upper end of a diaphragm housing 64 as at 65. The diaphragm housing 64 embodies a cap member 66 and a main cylindrical housing portion 67. The peripheral edge of a flexible diaphragm 68 is disposed between the cap 66 and the upper edge of the housing 67. The cap 66 is secured in position by means of screw bolts 69 and, consequently, the edge of the diaphragm 68 will be firmly clamped between member 66 and the upper edge of member 67. The cap 66 is substantially bell-shaped. A fluid-tight chamber is formed between the diaphragm and the cap 66 but this chamber is in communication with the tubular member 52, the lower end of which is always immersed in the molten glass in the spout 1. The chamber below the diaphragm 68 in the main portion 67 of the housing is in communication with the atmosphere by means of a vent 70. When the diaphragm 68 is in its uppermost position it always positively seats itself against the cap 66, as indicated in Figure 1. The diaphragm housing 64 is supported on a support 71.

The means for operating the diaphragm 68 comprises a piston rod 72 which is slidable in an opening 73 in the bottom of the portion 67 of the housing and which has its upper end connected as at 74 to a central point of the diaphragm 68. This piston rod 72 has its lower end connected to a piston 75 which reciprocates in a cylinder 76. The cylinder 76 is vertically adjustable on the support 71.

It will be apparent that if the piston 75 is moved to the opposite end of the cylinder from that where it is located in Figure 1, the piston rod 72 will be drawn downwardly. This will cause the diaphragm 68 to be flexed downwardly thereby creating vacuum in the member 52 which would tend to draw the molten glass away from the orifice 2. When the piston 75 is again moved back to the position indicated in Figure 1, the piston rod 72 will be moved upwardly, thereby flexing the diaphragm 68 upwardly and positively seating it against the cap 66 and thus eliminating the vacuum force in the member 52 and creating positive air pressure in member 52 which aids in expelling the glass through the orifice 2.

Figure 14:
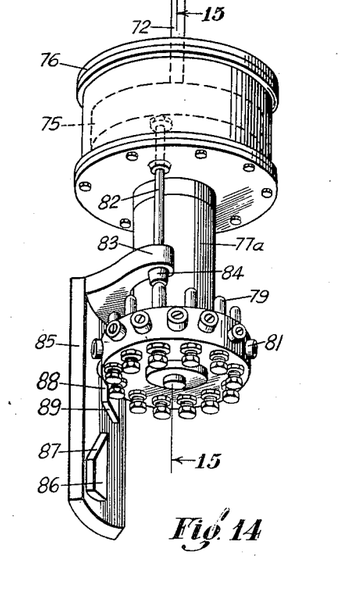
Figure 14 is a perspective view of the mechanism which I preferably employ for controlling the weight of the gobs of glass obtained by operation of the feeder illustrated in Figure 1.
Figure 15:
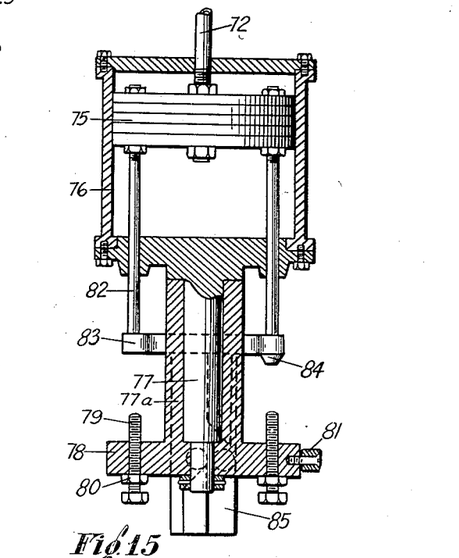
Figure 15 is a vertical section taken through the structure illustrated in Figure 14 substantially on line 15—15.

In order to vary the vacuum force produced in the member 52 by means of the diaphragm 68, I provide means for positively limiting the lowermost position of the diaphragm. This means is of such a nature that it may be adjusted so that during one complete cycle of operation gobs may be obtained which vary in weight in a predetermined manner or it may be adjusted so that all the gobs will be of uniform predetermined weight. This means is illustrated best in Figures 1, 14, and 15.

It comprises a cylindrical extension 77 depending from the cylinder 76 and connected thereto in such a manner that it will not rotate. This extension 77 has a tubular member 77a rotatably mounted thereon which carries an integral disk 78 on the lower end thereof. This disk is of considerably greater diameter than the tubular member 77a. The disk 78 is provided at circumferentially spaced intervals with a number of stop members 79. These stop members 79 take the form of bolts which are threaded upwardly through the disk 78 and project upwardly therefrom. The stops 79 may be adjusted so that they project through the disk to any desired extent merely by rotating them and they may be locked in position by means of lock nuts 80. On the peripheral edge of the disk 78 a plurality of circumferentially spaced rollers 81 are mounted.

The piston 75 has a pair of rods 82 extending downwardly through the lower end of the cylinder 76. The lower ends of these rods are connected to the outer ends of the arms of a bifurcated structure 83 which straddles the member 77a. One of the arms of the bifurcated structure adjacent its outer end is provided with a stop 84 which is adapted to contact with the upper end of any of the stops 79. The member 83 is connected to a vertically disposed plate 85, as indicated best in Figure 14, which is of arcuate cross-section. This member 85 always extends downwardly past the disk 78 and is disposed closely adjacent the periphery thereof. On the inner surface of the member 85 adjacent its lower end a cam member 86 is disposed and this cam member has an inclined cam surface 87. At a higher point on the member 85 a second cam member 88 is disposed and has an inclined cam surface 89. The cam members 86 and 88 are spaced laterally of each other and the cam surface 87 is inclined in a direction opposite to the direction of inclination of the cam surface 89.

It will be apparent that this structure will serve to limit the lowermost position of diaphragm 68. When the piston 75 moves downwardly and moves the diaphragm 68 downwardly, the member 85 also moves downwardly. During downward movement of the member 85, the cam surface 89 of cam 88 will contact with one of the rollers 81. This will cause rotation of the disk 78 relative to the extension 77 through one step. The amount of rotation is such that the stop 84 carried by the member 83 will contact the upper end of one of the stops 79. This will interrupt downward movement of the piston 75 and associated parts and, consequently, will interrupt downward movement of the diaphragm 68. Consequently, this will limit the amount of vacuum produced by the diaphragm. After the roller passes off the cam surface 89, it will rest against the vertically disposed edge of the cam 88 and reverse rotation will be prevented. This will insure that the stop 84 will contact with the stop 79.

Upon upward movement of the piston 75 and the member 85, the cam surface 87 of cam 86 will contact with the roller 81, adjacent the one with which the cam 88 contacted as described. This will cause the disk 78 to be rotated in the same direction through another step. After the roller passes off the cam surface 87, it will rest against the vertically disposed edge of the cam 86 and reverse rotation will be prevented. When the member 85 moves downwardly again, the cam 88 will contact with the next roller behind that with which the cam 86 contacts. Thus, during upward movement of member 85 the disk 78 is rotated one step and during downward movement of member 85 the disk is rotated another step. The stops 79 are equal in number to the rollers 81 and the rollers 81 are arranged midway between the stops. The cams 86 and 88 are so arranged that upon upward movement of member 85 the disk 78 is rotated a distance equal to one-half the distance between two adjacent stops 79 and upon downward movement the disk 78 is rotated an equal distance. This insures that the stop 84 will always contact with the successive stops 79.

It will be apparent that the stops 79 may be vertically adjusted so that they will extend through the disk 78 to the proper extents. If it is desired to obtain gobs which are all of uniform weight, all the stops 79 should be adjusted so that they all extend through the disk 78 the same distance. The weight of the gobs will depend upon the extent to which the stops 79 project through disk 78. However, by adjusting the stops 79 differently so that they extend through the disk varying distances, gobs of various weights but of predetermined weights may be obtained. In other words, with this structure it is possible to obtain in one complete cycle of operation gobs of a uniform and predetermined weight or gobs of various weights but of predetermined weights.

I provide means for adjusting the piston 75 and the cylinder 76 relative to each other in order to make substantial adjustments in the stroke of the piston. This means is illustrated best in Figure 1. The cylinder 76 is carried by a member 90 which is mounted for vertical movement on a portion of the support 71. This member 90 has a sleeve 90a with which a screw 91 cooperates. This screw 91 is rotatably mounted on the support 71 and is adapted to be rotated by means of a handwheel 91a. It will be apparent that if the handwheel 91a is rotated, the cylinder 76 will be adjusted relative to the piston 75. This adjusting mechanism may be employed to properly position the cylinder relative to the piston in order to obtain the proper stroke of the piston. However, it will be apparent that the stops 79 will be employed for obtaining fine adjustments to limit the lowermost position of the piston 75. The adjusting mechanism operated by screw 91 may be so set as to limit the uppermost position of the piston 75. However, this mechanism is preferably so adjusted that the diaphragm 68 will always seat on the cap 66, as indicated in this figure.

I also provide indicating means for indicating the position of the piston 75 in the cylinder 76. This means is also illustrated in Figure 1. It comprises a screw 92 which is rotatably mounted on the support 71 and may be rotated by means of handwheel 92a. This screw is adapted to move a pointer 93 which is mounted for vertical movement on the support 71. The pointer 93 is adapted to cooperate with a calibrated member 94 carried by the piston rod 72. The pointer 93 is vertically adjustable so that it may be set on the zero mark of the calibrations after the position of the piston 75 in the cylinder 76 is adjusted. Then the extent of downward movement of the piston, which is determined by the various stops 79, may be readily determined by observing the position of the pointer 93 relative to the calibrated member 94.

In Figure 20 I illustrate modified means for controlling the flow of glass through the discharge orifice 2 of the spout 1. In this instance instead of using a vacuum controlled means for controlling the discharge of glass through the orifice, I provide a plunger. However, in all other respects, the feeder is practically the same.

In this figure I show a plunger 52a of refractory material which projects into the glass in the spout 1 and whose lower end is disposed directly above the discharge orifice. This plunger 52a is made of refractory material and is removably carried by a screw 103. The screw 103 is vertically adjustable on a link 104 which is pivotally carried as at 105 by a lever 106. Thus, the plunger 52a may be adjusted relative to the orifice 2 and secured in adjusted position. The lever 106 has one end pivoted to a vertical support 107 as at 108. The upper end of the link 104 is pivotally connected to a link 109 which is pivotally connected to the upper end of the support 107 as at 110. It will be apparent that the links 104 and 109 tend to keep the plunger in substantially vertical position. The lever 106 is of considerable length and its free end is connected by pin-and-slot connection 111 to the upper end of a piston rod 72a. This piston rod corresponds to the piston rod 72 of Figure 1 and is connected to a piston operating in a cylinder 76 exactly the same as that illustrated in Figure 1. The means for predetermining the weight of the gobs is exactly the same as the structure disclosed in Figure 1 with the exception that it is located above the cylinder 76 instead of below it. Thus, the stops 79 will cooperate with the stop 84 to limit the uppermost position of the plunger 52a.

It will be apparent that when the piston in cylinder 76 moves upwardly and moves piston rod 72a upwardly, the lever 106 will pivot about the point 108 and the plunger 52a will be moved upwardly. This will draw the glass upwardly from the orifice 2. The extent of this upward movement is governed, as stated before, by the stops 79 and 84. The plunger 52a will be moved downwardly upon downward movement of the piston and cylinder 76 and, consequently, will force a predetermined amount of glass through the discharge orifice. The amount of glass forced through the discharge orifice will depend upon the extent to which the lower end of the plunger 52a is raised on the upward stroke, which is determined by the setting of the stops 79. If the stops 79 are set differently, gobs of different weights will be obtained.

The lowermost position of the plunger 52a will be determined by the adjustment of the screw 103 and by a stop formed on the inner end of a screw 95 which is threaded into the lower end of the cylinder 76. Thus the stops 79 limit the uppermost position of the plunger 52a and the stop on screw 95 limits the lowermost position of the plunger 52a. I provide identical mechanism as that illustrated in Figure 1, operated by means of screw 91, for adjusting cylinder 76 relative to the piston 75. I also provide indicating mechanism 93—94, exactly the same as that illustrated in Figure 1, for indicating the position of piston 75 in the cylinder 76 of this structure.

Air-operated control system

The air-operated control system for controlling operation of the various units of the feeder is illustrated in Figure 1. The air-operated system for controlling the plunger-type feeder is exactly the same as that illustrated in Figure 1 for controlling the vacuum-type feeder.

It will be noted from Figure 1 that I provide a valve 15a for controlling the cylinder 15 that operates the shears 12, a valve 21a for controlling the cylinder 21 that operates the gate 23, a valve 27a for controlling the cylinder 27 that operates the gate 24, and valve 76a for controlling the cylinder 76 that operates the vacuum control or the plunger control for controlling the feeding of the glass through the discharge orifice. All of these valves are of identical construction.

The valve 27a is illustrated in detail and a description of this valve will serve for all the valves of this kind. This valve comprises a cylindrical housing 112 in which a piston 113 is adapted to reciprocate. Adjustable stops 114 are provided in the ends of the cylinder 112 to limit reciprocation of the piston 113. The piston 113 has a substantially U-shaped passageway 115 therein and a second passageway 116 formed therein. An opening 117 is provided at one end of the cylinder and an opening 118 is provided at the other end of the cylinder. These openings 117 and 118 are located at the extreme ends of cylinder 112 so that they will never be covered by the piston 113. The cylinder is provided at its top with an opening 119 and a similar opening 120 and an exhaust opening 121 located between these openings. The passageway 116 is always in communication with the exhaust opening 121 and is also alternately in communication with the openings 119 and 120. The passageway 115 is always in communication with a main air line opening 122 and alternately with the openings 119 and 120.

The opening 122 is connected to a main air line 123. The opening 117 is connected by means of a line 124 to a timer 125. The opening 118 is connected to the timer 125 by a line 126. The opening 119 is connected by a line 127 to one end of the cylinder 27 and the opening 120 is connected to the opposite end of the cylinder by a line 128. Similar lines are provided for connecting the valves 15a, 21a, and 76a, to their respective cylinders and to a timer 125. As will be noted, I provide two of the timers 125. Interposed in the line 127 connecting one end of cylinder 112 to the cylinder 27 is a valve 27b and interposed in the line 128 connecting the other end of the cylinder 112 to the cylinder 27 is a valve 27c. These valves are the same. In the lines connecting the ends of valve 21a to cylinder 21 I provide valves 21b and 21c, in the lines connecting the ends of valve 15a to cylinder 15 I provide valves 15b and 15c, and in the lines connecting the valve 76a to cylinder 76 I provide valves 76b and 76c, all of which are of identical construction.

The valve 27b is illustrated in detail. It comprises a housing having a passageway 127a and a passageway 127b to which line 127 is connected. A duct 129 controlled by an adjustable needle valve 130 establishes communication between the passageways 127a and 127b. A second duct 131 controlled by a ball seat valve 132 also establishes communication between passageways 127a and 127b. The ball is adapted to seat by gravity to close the duct 131 at the proper time and to move off its seat to open the duct at the proper time. A clean-out port is closed by a nut 133 which has a depending sleeve 133a which limits movement of ball 132 off its seat. This sleeve is perforated so as not to interfere with passage of air through passage 127b.

When air is admitted to the line 124 by the timer 125, in a manner to be described, it will flow into the valve 27a forcing the piston 113 into the position indicated in Figure 1. This will permit the main air from the line 123 to flow through the opening 122, through passageway 115 in the piston, through line 127, through passageway 127a in valve 27b, past the ball seat valve 132 and the needle valve 130, through pasageway 127b and through line 127 into the left hand end of cylinder 27 to force the piston 26 to the right, as indicated in Figure 1. The air from the opposite side of the piston 26 will exhaust from cylinder 27 through line 128 and through valve 27c which is exactly the same as the valve 27b. During passage of the exhaust air through valve 27c, the ball valve thereof is seated by gravity and the exhaust air must pass the needle valve which corresponds to the needle valve 130 on valve 27b. Thus, this needle valve may be adjusted to produce a cushioning effect which will prevent too rapid movement of the piston 26. After the exhaust air leaves the valve 27c it again flows through line 128, through opening 120 in valve 27a, through passageway 116 in piston 113, and through the vent 121 to the atmosphere. In this manner the gate 24 is opened.

When air is permitted to flow through line 126 by the timer 125, it will force the piston 113 to the opposite end of the cylinder 112. This will permit the air from the main line 123 to flow through passageway 115, opening 120, line 128, valve 27c, line 128, into the right hand end of cylinder 27 forcing the piston 26 to the left. The air from the left hand end of the cylinder will exhaust through line 127, passage 127b in valve 27b, past the needle valve 130, through passageway 127a, through line 27, through opening 119, through passageway 116 in piston 113 and then to the atmosphere through vent 121. Thus, the gate 24 will be closed. It will be apparent that the speed of operation of the gate 24 may be controlled by setting the needle valve 130 of valve 27b and the corresponding needle valve of the valve 27c.

The valves 21a, 21b, and 21c control cylinder 21 in exactly the same manner. The valves 15a, 15b, and 15c control cylinder 15 in exactly the same manner. The valves 76a, 76b, and 76c control cylinder 76 in exactly the same manner.

Additional means for controlling issuance of glass through spout orifice

Besides the air control mechanism previously described, I provide air controlled mechanism for withdrawing air from the passageway 7a above the gate 17 or for supplying air under pressure in the space above said gate. This mechanism is also illustrated in Figure 1. I provide a diaphragm control which is controlled by cylinder and piston mechanism substantially identical to the diaphragm and the controls therefor provided for controlling the issuance of glass through the spout orifice and which I previously described.

This mechanism comprises a cylinder 760 having a piston 750 operating therein. This piston 750 is connected by a piston rod 720 to a diaphragm 680 which is disposed in a housing 640. This diaphragm structure is exactly the same as the diaphragm 68 and associated parts. A line 630 leads from the upper end of the diaphragm housing and passes through a heater 97 of any suitable type. This line 630 is connected to a valve 98. A screen 99 is also interposed in the line to prevent any foreign matter from passing through the line and reaching the glass in the spout orifice. The valve 98 is connected to the passageway 23 in the gate 17 by means of a line 100. The valve 98 has a main inlet 98a and a main exhaust opening 98b. It has a double piston 98c disposed for reciprocation therein.

The line 630 is normally in communication with the line 100 which is connected to the passageway 7a above the gate 23. Consequently, when the diaphragm 680 is flexed, vacuum will be produced in the space above the gate 17 or positive air pressure will be supplied in the space depending upon whether the diaphragm is flexed upwardly or downwardly. Flexing of the diaphragm is controlled by the piston 750 in exactly the same manner that the piston 75 controls flexing of the diaphragm 68. When the piston 750 moves downwardly, the diaphragm 680 will be moved downwardly and vacuum will be created in the passageway 7a above the gate 17. On the other hand, when the piston 750 moves upwardly, positive air pressure will be supplied in the passageway 7a above the gate 17. Upward movement of the piston 750 will be limited by seating of the diaphragm 680 against the cap on the diaphragm housing. Downward movement of the piston 750 will be limited by an adjustable stop 101 provided in the lower end of the cylinder 760.

Movement of the piston 750 in the cylinder 760 is controlled in exactly the same manner that movement of piston 75 in cylinder 76 is controlled. Thus, a valve 760a exactly the same as valve 27a, and valves 760b and 760c exactly the same as valve 27b, are provided for controlling the piston 750. The valve 760a is connected to one of the timers 125 in exactly the same manner that the valve 27a is connected thereto. A line 134 leads from one of the timers 125 to one end of the valve 98 and a line 135 leads from the timer to the opposite end of the valve 98. The line 134 is controlled by a manually operable valve 134a and the line 135 is controlled by a manually operable valve 135a.

It will be apparent that when the piston 98c is in the position in the valve 98 indicated in Figure 1, the line 100 will be connected to the line 630. Consequently, when the diaphragm 680 is moved downwardly by downward movement of piston 760 a vacuum force will be created in the space above the gate 17 in passageway 7a. This force will tend to draw the glass through the spout orifice. When the diaphragm is moved upwardly by upward movement of the piston 750, air will be forced upwardly from the diaphragm housing through line 630, through valve 98, and through the line 100 into the space in passageway 7a above the gate 17. This positive air pressure will tend to force the glass upwardly within the spout orifice. To prevent chilling of the glass in the orifice, this air will be heated before it reaches the glass by means of the heater 97. Furthermore, any foreign matter in the air will be precluded from reaching the glass in the orifice by the screen 99. Movement of the piston 750 is controlled by the timer 125 and the valves 760a, 760b, and 760c. Thus, I provide means for gradually applying a vacuum force below the glass issuing from the spout orifice in order to aid in issuance of the glass from the orifice or for gradually applying a positive air pressure which tends to cause the flow of glass through the orifice to be retarded and aids in gradually forcing the glass back within the orifice. Furthermore, it will be apparent that this means may be timed so that it will effectively cooperate with the means for controlling the flow of the glass from the spout orifice which I previously described and which includes the diaphragm 68.

The line 135 leading to the valve 98 from the timer 125 is controlled by the manually operable valve 135a and the line 134 leading to the valve 98 from the timer is controlled by the manually operable valve 134a. The timer operates to permit a puff of air, at the proper time, to flow through the line 135 into the valve 98 forcing the piston 98c to the position indicated in Figure 1. This establishes communication between line 630 and line 100. Consequently, the diaphragm 680 when actuated by the piston 750 will gradually withdraw the air from the space in the tube 7 above gate 17, upon downward movement of the diaphragm, while upon upward movement of the diaphragm, air pressure will be gradually applied to said space.

However, the timer may be so arranged that at the proper instant, a puff of air will pass through the line 134 into the lower end of the cylinder 98 forcing the piston 98c upwardly. This will render the means for creating vacuum or air pressure in said space above gate 17 ineffective. Upon upward movement of the diaphragm 680, the air will flow through the line 630, through the opening 98a, through the space around the piston 98c and out through the vent 98b. Likewise, upon downward movement of the diaphragm 680 the vacuum force will be ineffective since the line 100 is disconnected from the line 630, the line 630 being in communication with the atmosphere through the opening 98a, the space around piston 98c and the vent 98b. The valve 98 is provided with very small vents 98d at each end which permit the movements of the piston 98c. However, these vents are very small in comparison with the inlet from the line 135 to the valve 98 and the inlet from the line 134 in order that when pressure is applied to one side of the piston an insufficient amount of air will exhaust through the opening 98d, at the corresponding side of the piston, to preclude movement of the piston. However, a sufficient amount of air will exhaust through the opening 98d on the opposite side of the piston to permit movement of the piston. The operation of valve 98 may be timed in any desired manner relative to the operation of the diaphragm 680 and diaphragm 68, by means of the timer 125, in a manner which will be more readily apparent hereinafter. For example, operation of valve 98 may be so timed that at certain periods movement of diaphragm 680 will be ineffective to produce either vacuum or air pressure in the space above gate 17 while at other periods the diaphragm will be effective to produce both vacuum and air pressure in said space. Or, for example, it may be timed relative to operation of the diaphragm 680, so that the diaphragm will be effective only to produce one or the other of the forces in said space.

If it is desired that the diaphragm 680 function alternately at regular intervals to produce vacuum and air pressure in said space, the valve 98 may be rendered inoperative. For example, the manually operative valves 135a and 134a may be operated to move the piston 98c into the position indicated in Figure 1 and then both may be closed so that the timer will have no effect on the valve 98. Then every time the diaphragm 680 moves upwardly, positive air pressure will be supplied in the space above gate 17 and every time the diaphragm moves downwardly, air will be withdrawn from said space. On the other hand, the valves 135a and 134a may be manipulated to position the piston 98c at the opposite end of the valve from that illustrated in Figure 1 and then both may be closed so that the timer will have no effect on the valve. Then when the diaphragm 680 moves downwardly it will have no effect in producing vacuum in said space since the line 630 will be in communication with the atmosphere through opening 98a, the space around piston 98c, and the opening 98b. Likewise, when the diaphragm 680 moves upwardly, pressure will not be supplied to said space because the air will flow through line 630, opening 98a, around the piston 98c and through the opening 98b to the atmosphere.

Thus, it will be apparent that any desired conditions of vacuum or air pressure may be created in the space in the passageway 7a above the gate 17. The vacuum force will aid in extruding the glass through the orifice while the air pressure will aid in forcing it back within the orifice. Furthermore, this vacuum and pressure creating means may be timed relative to the means for creating vacuum or pressure above the glass in the orifice. In other words, I have provided effective means for controlling flow of glass through the orifice which may be adjusted to meet varying conditions of the viscosity of the glass in the spout. The vacuum and pressure creating means, including diaphragm 680, just described may be employed with the vacuum control, embodying diaphragm 68, or may be employed with the plunger control illustrated in Figure 20. However, it will be apparent that the diaphragm 68 and associated parts illustrated in Figure 1 or the plunger control illustrated in Figure 20 will be the main control means for controlling flow of glass from the spout.

Figure 12:
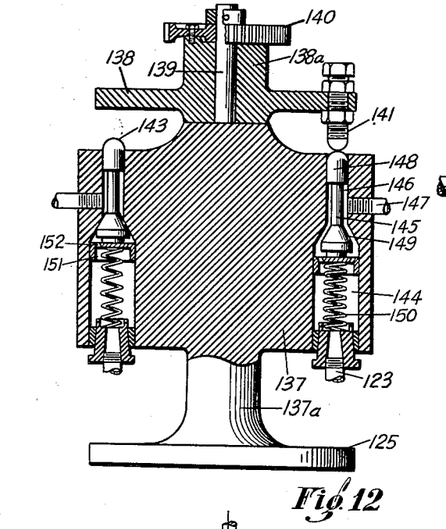
Figure 12 is a vertical section taken through a timer used to control the operation of the glass feeder illustrated in Figure 1.
Figure 13:
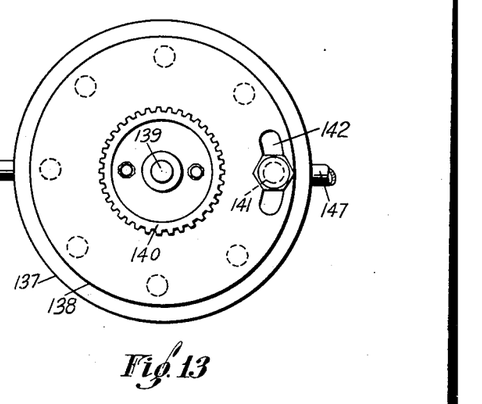
Figure 13 is a plan view of the timer illustrated in Figure 12.

One of the timers 125 is illustrated in detail in Figures 12 and 13. It embodies a main casting 137 supported by a standard 137a. On the upper end of this casting 137 a disk member 138 is rotatably mounted on an upstanding pin 139. A pinion 140 is attached to the hub 138a of disk 138. This disk carries a valve tripping member 141 which embodies a vertically adjustable bolt. Member 141 is mounted in an arcuate slot 142 formed in the disk 138 and is adjustable along said slot and may be secured in adjusted position. This member 141 is adapted to trip, at proper intervals, a plurality of poppet valves 143 disposed at circumferentially spaced locations in the casting 137.

Each poppet valve is mounted in a socket 144 formed in the member 137. Each valve embodies a stem 145 having a reduced portion adjacent its upper end which forms a passageway 146 which is always in communication with an opening 147 in which is inserted the end of one of the air lines leading from the timer. The stem is enlarged at its upper end as at 148 to prevent escape of air at this point and this portion projects upwardly from the member 137 and is adapted to contact with the tripping member 141. The stem has a bevelled valve surface 149 which normally seats on a valve seat formed in the socket 144. The valve is held on its seat by means of a compression spring 150 which bears against a cup 151 on the lower end of the valve stem. This cup is provided with small openings 152 to permit air to pass thereby. The lower end of the socket or chamber 144 is connected to the main air line 123.

It will be apparent that normally the air from the main air line 123 will not flow past the member 149 which is normally seated on a valve seat. However, when the member 138 rotates to such an extent that the tripper 141 contacts with the upper end of the poppet valve, the valve will be unseated, as indicated in Figure 12. This will permit the air from the main air line to flow through the chamber 144 past the member 149 through passageway 146 and through opening 147 into the line to which it is connected. The poppet valve, however, will only be open for an instant so that only a puff of air will flow into the line which is connected to the member to be operated.

I provide another line 136 which leads from one of the timers 125 to the line 630 to which it is connected at a point directly above the diaphragm housing 640. This line has an oil container 136a which permits a small amount of oil or other hydrocarbon fuel to drop into the line 136. Since the line 136 is connected to one of the timers 125, at selected intervals a puff of air will be permitted to flow through this line. This will carry the oil into the line 630. It will pass through the heater 97 which will cause free carbon to be forced from the oil. When this air carrying the carbon finally reaches the space in the passageway 7a above gate 17, it will contact with the glass being extruded through the orifice and will form a film of carbon on the outer surface of the glass. This film of free carbon will serve as a lubricant to aid in eliminating or reducing to a minimum mold marks or other marks produced in working the glass. If the oil is not carbonized by heater 97 it will be carbonized when it reaches the space above the gate 17.

As previously stated, I provide two of the timers 125. However, any desired or required number may be employed. They are both rotated simultaneously at the same speed by means of a pinion 153 which meshes with the pinions 140, as indicated in Figure 1. One timer operates the cylinders 15, 21, and 27, but also controls passage of air through line 136, and is therefore provided with seven poppet valves. The other timer operates cylinders 76 and 76a and valve 98 and is therefore provided with six poppet valves. The timers are so adjusted that the various units will operate at the proper time. I provide two timers 125 because it is necessary for certain units to function simultaneously and better timing of the various units can be obtained with two or more timers.

The operation

I will now describe the operation of the entire feeder. This description will apply both to the vacuum-controlled feeder illustrated in Figure 1 and to the plunger-controlled feeder illustrated in Figure 20. Figures 2 to 11, inclusive, illustrate various steps in the feeding of the glass to the mold. The vacuum member 52 or the plunger 52a is properly adjusted vertically relative to the orifice depending upon the viscosity condition of the glass and the size of the gobs to be obtained. The stops 79 are adjusted in such a manner that the gobs produced will be of a predetermined uniform weight or the weight of the gobs will vary in a predetermined manner. The timing mechanism is properly adjusted so that operation of the various units will occur at the proper instants. The feeder is then ready for operation.

Figures 2, 3:
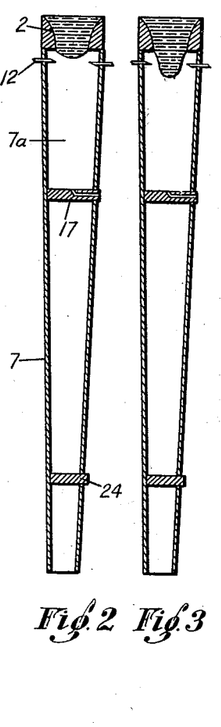
Figures 2 to 11, inclusive, are diagrammatic views illustrating successive steps in the operation of my glass feeder.

With reference to Figure 2 it will be seen that the glass in the orifice 2 is beginning to flow downwardly from the orifice. At this time the vacuum in tube 52 is effective or the plunger is raised. The shears 12 are open and the gates 17 and 24 are closed.

As illustrated in Figure 3, the glass in the orifice has issued from the orifice a greater extent. The shears are still open and the vacuum is still effective or the plunger is raised. Gates 17 and 24 are still closed. By means of passageway 23, fluid pressure is being administered gradually or extracted gradually whichever the glass conditions require to keep the gob in a solid formation.

Figures 4, 5, 6:
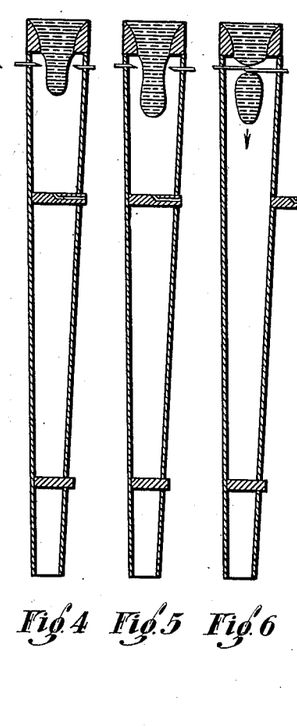

In Figure 4 the gob is becoming larger and the glass has issued to a greater extent from the orifice. The vacuum force is about to be released or the plunger is about to be started on the downward stroke. The shears are open. Gates 17 and 24 are still closed. Fluid is still being administered or extracted from the chamber above the gate 17 so as to affect the gob as desired.

In Figure 5 the gob is in the condition that occurs when the positive pressure is being applied on the glass above the orifice with the tube 52 or the plunger 52a. By means of the fluid pressure applied or extracted through passageway 23 above the gate 17, the proper diameter of the gob is still maintained. The shears are open and the gates 17 and 24 are still closed.

Between the condition illustrated in Figure 5 and that illustrated in Figure 6, the positive pressure in the tube 52 has been spent or the plunger has reached its lowermost position. The vacuum force which begins to be created at this time or the upward movement of the plunger which starts at this time causes the gob to neck, forming a thin neck which may be sheared easily without shear marks. Simultaneously, the shears 12 operate to sever the gob of glass as indicated in Figure 6. The gob starts to drop and the gate 17 is opened to permit dropping of the gob. At this time the gate 24 is still closed.

Figure 7:
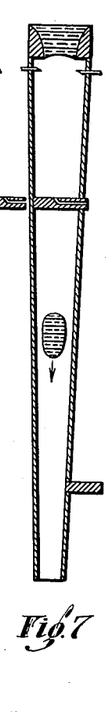

Then, as illustrated in Figure 7, the vacuum force or the upward movement of the plunger causes the stream of glass from which the gob was severed to be drawn upwardly into the orifice. This may be facilitated by applying pressure through the passageway 23 of gate 17 which has been closed by this time. The shears are open. The gob previously cut from the stream has passed the gate 17, which is now closed, and dropping thereof through the tube 7 is continuing. The gate 24 at this time is open to permit passage of the gob from the tube 7 into the mold.

Figure 8:
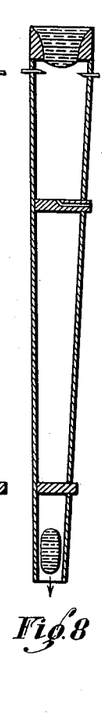

Figure 8 illustrates the conditions indicated in Figure 2 but showing the previously severed gob almost out of the tube with the gate 24 closed.

Figure 9:
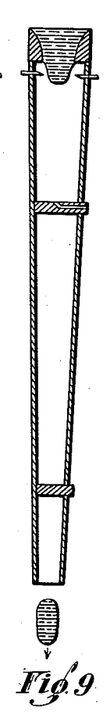
Figure 10:
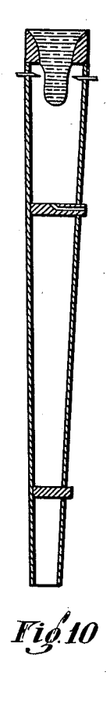
Figure 11:
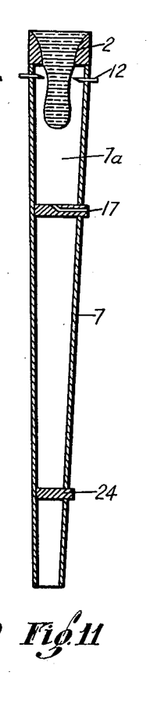

Figure 9 illustrates the same conditions as Figure 3 and Figures 10 and 11 illustrate the same conditions as in Figures 4 and 5.

It will be apparent from the above description that I have provided apparatus for feeding glass having many desirable and novel characteristics.

I have provided a practical apparatus for feeding molten glass from a glass melting furnace to a mold in such a manner that the glass will not be affected in any way by atmospheric conditions. Furthermore, I have provided apparatus for feeding molten glass in the form of charges of predetermined weight which vary in weight in any predetermined manner during one complete cycle of operation or which may all be of a uniform weight. The glass feeder which I have provided is simple, practical and efficient. The speed of operation of the various units and the character of the gobs or charges produced may be controlled and varied in an effective manner and within a very wide range.

Other advantages will be apparent from the preceding description, the drawings and the following claims.

Having thus described my invention, what I claim is:

1. In combination, a glass feeder comprising a spout for the molten glass having a discharge orifice, a mold disposed a considerable distance below the discharge orifice, means for preventing atmospheric conditions from affecting the glass discharged through said orifice during the time it drops from the orifice to said mold, said means comprising a conduit extending from a point adjacent the orifice to a point adjacent the mold, said conduit being normally closed from the atmosphere, said conduit having a plurality of gates for opening and closing the passageway therein, and means for operating said gates at different intervals.

2. In combination, a glass feeder comprising a spout for the molten glass having a discharge orifice, a mold disposed a considerable distance below the discharge orifice, means for preventing atmospheric conditions from affecting the glass discharged through said orifice during the time it drops from said orifice to said mold, said means comprising a conduit extending from a point adjacent the orifice to a point adjacent the mold, said conduit being normally closed from the atmosphere, a gate for opening and closing the passageway therein, and means for applying or extracting fluid pressure in the conduit above said gate so as to control the shape of the gobs issuing from said orifice.

3. In combination, a glass feeder comprising a spout for the molten glass having a discharge orifice, a mold disposed a considerable distance below the discharge orifice, means for preventing atmospheric conditions from affecting the glass discharged through said orifice during the time it drops from the orifice to said mold, said means comprising a member normally closed to the atmosphere and extending from a point adjacent the orifice to a point adjacent the mold, a shear structure for shearing the glass issuing from said orifice, said shear structure being in the form of a compact unit which is located within said member, a gate for opening and closing the passageway in said member, and means for operating said gate and said shear structure in timed relationship to each other.

4. In combination, a glass feeder comprising a spout for the molten glass having a discharge orifice, a mold disposed a considerable distance below the discharge orifice, means for preventing atmospheric conditions from affecting the glass discharged through said orifice during the time it drops from the orifice to said mold, said means comprising a member normally closed to the atmosphere and extending from a point adjacent the orifice to a point adjacent the mold, a shear structure for shearing the glass issuing from said orifice, said shear structure being in the form of a compact unit which is located within said member, a gate for opening and closing the passageway in said member, means for applying or withdrawing fluid pressure in said member above said gate, and means for operating said last-named means, said gate and said shear structure in timed relationship to each other.

5. A glass feeder comprising a spout having a discharge orifice, means for controlling the flow of glass through said orifice, said means comprising mechanism for causing charges of glass of predetermined weight to flow from said discharge orifice, said mechanism being adjustable in such a manner that all the charges of glass during one complete cycle of operation will be of uniform predetermined weight or in such a manner that the charges will vary in weight in a predetermined manner.

6. A glass feeder comprising a spout having a discharge orifice, means for controlling the flow of glass through said orifice, said means comprising mechanism for causing charges of glass of predetermined weight to flow from said discharge orifice, said mechanism being adjustable in such a manner that all the charges of glass during one complete cycle of operation will be of uniform weight or in such a manner that the charges will vary in weight in a predetermined manner, and means for preventing the charges of glass from being affected by atmospheric conditions during passage of the charges from the orifice to the molds in which they are shaped.

7. A glass feeder comprising a spout having a discharge orifice, means for controlling the flow of glass through said orifice, means for controlling said last-named means, said means comprising a cylinder and a piston, one of which is movable relative to the other, and means adapted to contact with a member carried by the movable element to limit movement thereof in one direction, said means comprising a plurality of members adapted to contact with said member carried by said movable element at successive intervals, said members permitting movement of said movable element to different extents at successive intervals.

8. A glass feeder comprising a spout having a discharge orifice, means for controlling the flow of glass through said orifice, said means comprising a cylinder and a piston, one of which is movable relative to the other, and means adapted to contact with a member carried by the movable element to limit movement thereof in one direction, said means comprising a plurality of members adapted to contact with said members carried by said movable element at successive intervals, said members being adjustable relative to each other so as to permit movement of said movable element to different extents at successive intervals or to the same extent at successive intervals.

9. A glass feeder comprising a spout having a discharge orifice, means for controlling the flow of glass through said orifice, means for controlling said last-named means, said means comprising a cylinder and a piston, said piston being movable relative to the cylinder, a rotatable member carrying a plurality of stop members which are adapted to contact with a stop member carried by said piston at successive intervals, and means carried by said piston for rotating said stop carrying member step by step to bring the successive stops in position to contact with the stop member carried by said piston.

10. A glass feeder comprising a spout having a discharge orifice, means for controlling the flow of glass through said orifice, means for controlling said last-named means, said means comprising a cylinder and a piston, said piston being movable relative to the cylinder, a rotatable member carrying a plurality of stop members which are adapted to contact with a stop member carried by said piston at successive intervals to limit movement of said piston in one direction, and means carried by said piston for rotating said stop carrying member step by step to bring the successive stops in position to contact with the stop member carried by said piston, said stops carried by said rotatable member being adjustable relative to each other to vary the extent of movement of said piston.

11. A glass feeder comprising a spout having a discharge orifice, means for controlling the flow of glass through said orifice, means for controlling said last-named means, said means comprising a cylinder and a piston, one of which is movable relative to the other, means adapted to contact with a member carried by the movable element to limit movement thereof in one direction, said means comprising a plurality of members adapted to contact with said member carried by said movable element at successive intervals, said members being adjustable relative to each other so as to permit movement of said movable element to different extents at successive intervals or to the same extent at successive intervals, and means for adjusting said cylinder and said piston relative to each other.

12. A glass feeder comprising a spout having a discharge orifice, means for controlling the flow of glass through said orifice, said means comprising a vacuum tube substantially in alignment with said orifice, a diaphragm for producing vacuum or positive air pressure in said tube, and means for flexing said diaphragm, said means comprising a member connected thereto for positively flexing said diaphragm.

13. A glass feeder comprising a spout having a discharge orifice, means for controlling the flow of glass through said orifice, said means comprising a tube substantially in alignment with said orifice, a diaphragm for varying the fluid pressure in said tube, and means for flexing said diaphragm, said means comprising cylinder and piston mechanism and including a rod connected to said diaphragm.

14. A glass feeder comprising a spout having a discharge orifice, means for controlling the flow of glass through said orifice, said means comprising a tube substantially in alignment with said orifice, a diaphragm for varying the fluid pressure in said tube, said diaphragm being disposed in a housing, means for flexing the diaphragm including cylinder and piston mechanism, said diaphragm housing having a seat against which the diaphragm always seats when flexed in one direction, and means for limiting the extent to which the diaphragm is flexed in the opposite direction, said means being adjustable to permit the diaphragm to be flexed to the said extent or to various extents at successive intervals.

15. A glass feeder comprising a spout having a discharge orifice, means for controlling the flow of glass through said orifice, said means comprising mechanism for causing the charges of glass of predetermined weight to flow from said discharge orifice, said mechanism being adjustable in such a manner that all the charges of glass during one complete cycle of operation will be of uniform weight or in such a manner that the charges will vary in weight in a predetermined manner, a shear structure for separating the charges of glass, means for preventing the charges of glass from being affected by atmospheric conditions during passage of the charges from the orifice to the molds in which they are shaped, said means including a conduit normally closed to the atmosphere and having a gate for opening and closing the passageway formed therein, and means for operating the flow-controlling means, the shear structure and the gate in said conduits in timed relationship to each other.

16. A glass feeder comprising a spout having a discharge orifice, shear structure located below the orifice for separating the glass into charges, means for controlling the flow of glass through said orifice, said means comprising mechanism operating in timed relationship to said shears for causing charges of glass of a predetermined weight to flow from said discharge orifice, said mechanism being adjustable in such a manner that all the charges of glass during one complete cycle of operation will be of uniform weight or in such a manner that the charges will vary in weight in a predetermined manner.

17. A glass feeder comprising a spout having a discharge orifice, a shear structure located below the orifice for separating the glass into charges, means for controlling the flow of glass through said orifice, said means comprising mechanism operating in timed relationship to said shears for causing charges of glass of a predetermined weight to flow from said discharge orifice, said mechanism being adjustable in such a manner that all the charges of glass during one complete cycle of operation will be of uniform weight or in such a manner that the charges will vary in weight in a predetermined manner, means for preventing the charges of glass from being affected by atmospheric conditions during passage of the charges from the orifice to the molds in which they are shaped, said means including a conduit normally closed to the atmosphere and having a gate for opening and closing the passageway formed therein, means for applying fluid pressure or withdrawing fluid pressure in said conduit above said gate, and means for operating said last-named means and said gate in timed relationship to each other and in timed relationship to said shear structure and said glass-controlling means.

GEORGE T. MEYERS.